(12) United States Patent
Xiong et al.

(10) Patent No.: US 6,928,553 B2
(45) Date of Patent: Aug. 9, 2005

(54) PROVIDING INTERNET PROTOCOL (IP) SECURITY

(75) Inventors: Jize Xiong, Acton, MA (US); Jerome Freedman, Burlington, MA (US)

(73) Assignee: Aastra Technologies Limited, Concord (*) Notice: Subject to any disclaimer, the term of this patent is extended or adjusted under 35 U.S.C. 154(b) by 124 days.

(21) Appl. No.: 09/954,955

(22) Filed: Sep. 18, 2001

(65) Prior Publication Data

US 2003/0061507 A1 Mar. 27, 2003

(51) Int. Cl.[7] .................................................. H04L 9/00
(52) U.S. Cl. ...................................... 713/200; 713/201
(58) Field of Search ............................... 713/150–154, 713/160–162, 166, 168, 170, 200–201; 711/100, 118, 126, 163; 709/200, 217, 219; 707/1, 3, 9, 10

(56) References Cited

U.S. PATENT DOCUMENTS

| 6,035,399 A | 3/2000 | Klemba et al. | |
| 6,088,451 A | * 7/2000 | He et al. | 713/201 |
| 6,178,504 B1 | 1/2001 | Fieres et al. | |
| 6,178,505 B1 | * 1/2001 | Schneider et al. | 713/168 |
| 6,505,192 B1 | * 1/2003 | Godwin et al. | 707/3 |

OTHER PUBLICATIONS

Notification of Transmittal of the International Search Report or the Declaration for International Application No. PCT/US02/29403.

* cited by examiner

Primary Examiner—Hosuk Song
(74) Attorney, Agent, or Firm—Fish & Richardson P.C.

(57) ABSTRACT

A method of providing Internet Protocol (IP) security at a network layer, that includes using two or more independent databases to process secure information, with a first database specifying a set of rules for the IP security and a level of security, and with a second database maintaining security information for at least two systems.

28 Claims, 7 Drawing Sheets

PROVIDING INTERNET PROTOCOL (IP) SECURITY

TECHNICAL FIELD

This invention relates to Internet Protocol Security.

BACKGROUND

Communication over the Internet requires a sender to send information over a network and a receiver to receive the information. Often senders desire confidentiality so that only certain receivers who have the senders' permission may receive the information. Senders encrypt their messages so only a select group of receivers who have a key to decrypt the message may receive the information. Malicious attacks occur when individuals try to gain access to the information without permission from the sender.

SUMMARY

The invention relates to providing Internet Protocol (IP) security.

In general, in one aspect, the invention is a method of providing IP security (IPSec) at a network layer, that includes using two or more independent databases to process secure information, with a first database specifying a set of rules for the IP security and a level of security, and with a second database maintaining security information for at least two systems.

This aspect may include one or more of the following features. The first database is cached and includes a plurality of security policy entries having at least a source IP address, a destination IP address, an IP protocol, a source port and/or a destination port. The first database uses a Practical Algorithm to Retrieve Information coded in Alphanumeric (PATRICIA) tree to look-up entries.

The second database includes a plurality of security association entries that define an IP destination, an IP security protocol, and a security parameter index. The second database uses a hash table to look-up entries.

In general, in another aspect, the invention is directed to an apparatus for transmitting data packets. The apparatus includes a processor that executes instructions, and a memory that stores executable instructions for causing the processor to use two or more independent databases to process secure information. A first database specifies a set of rules for the IP security and a level of security, and a second database maintains security information for at least two systems.

The embodiments may have one or more of the following advantages. For example, the security arrangements can provide strong, i.e., difficult to hack access control, connectionless integrity, data origin authentication, replay protection and confidentiality at the network layer.

DETAILED DESCRIPTION

Figure 1:
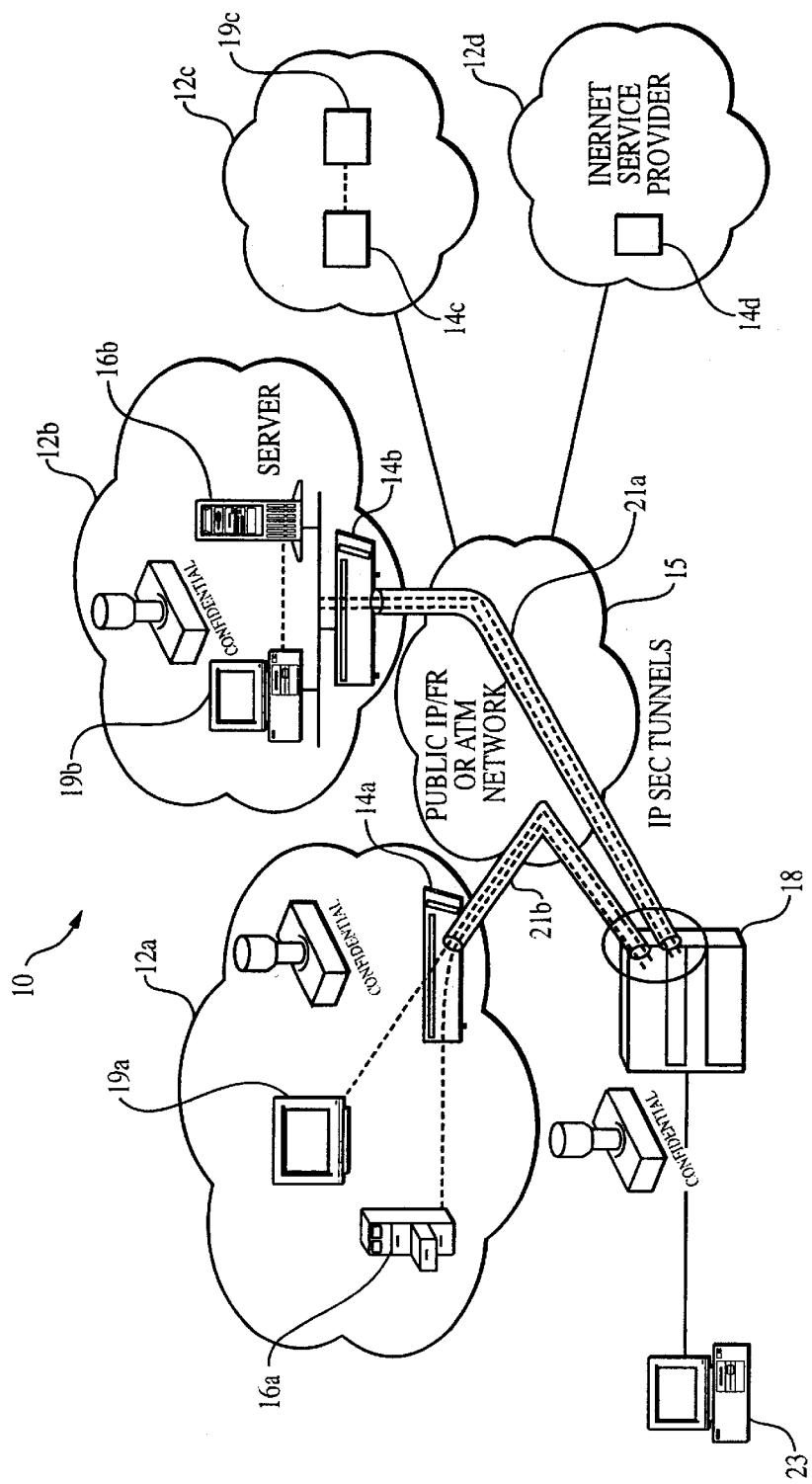
FIG. 1 is a high-level block diagram representation of a network system.

Referring to FIG. 1, a typical network arrangement 10 is shown. The network arrangement 10 includes four different private networks 12a–12d interconnected via a network 15 which can be the Internet, a Frame Relay (FR) network, Asynchronous Transfer Mode (ATM), etc. Each domain includes an IPSec Virtual Private Network (VPN) gateway (e.g., VPN gateway 14a–-14d), which provides a firewall, a server computer (e.g., server computer 16a–16b) and one or more clients (e.g., clients 19a–19c). A remote access server (RAS) 18 handles secure communications between private networks, e.g., private networks 12a and 12b. The connection between the domains may be made using IPSec tunnel mode through IPSec tunnels 21a–21b. Access to RAS 18 may also be made by a dial-in modem 23. Network arrangement 10 has two levels of security: (1) management and control message traffic from clients, 19a–19c and (2) dial-in access from a dial in modem. Therefore, security is required from domain or dial-in locations. Thus, for instance, a user at a client 19b at private network 12b requires confidential communication with RAS 18 over the network 15.

Figure 2:
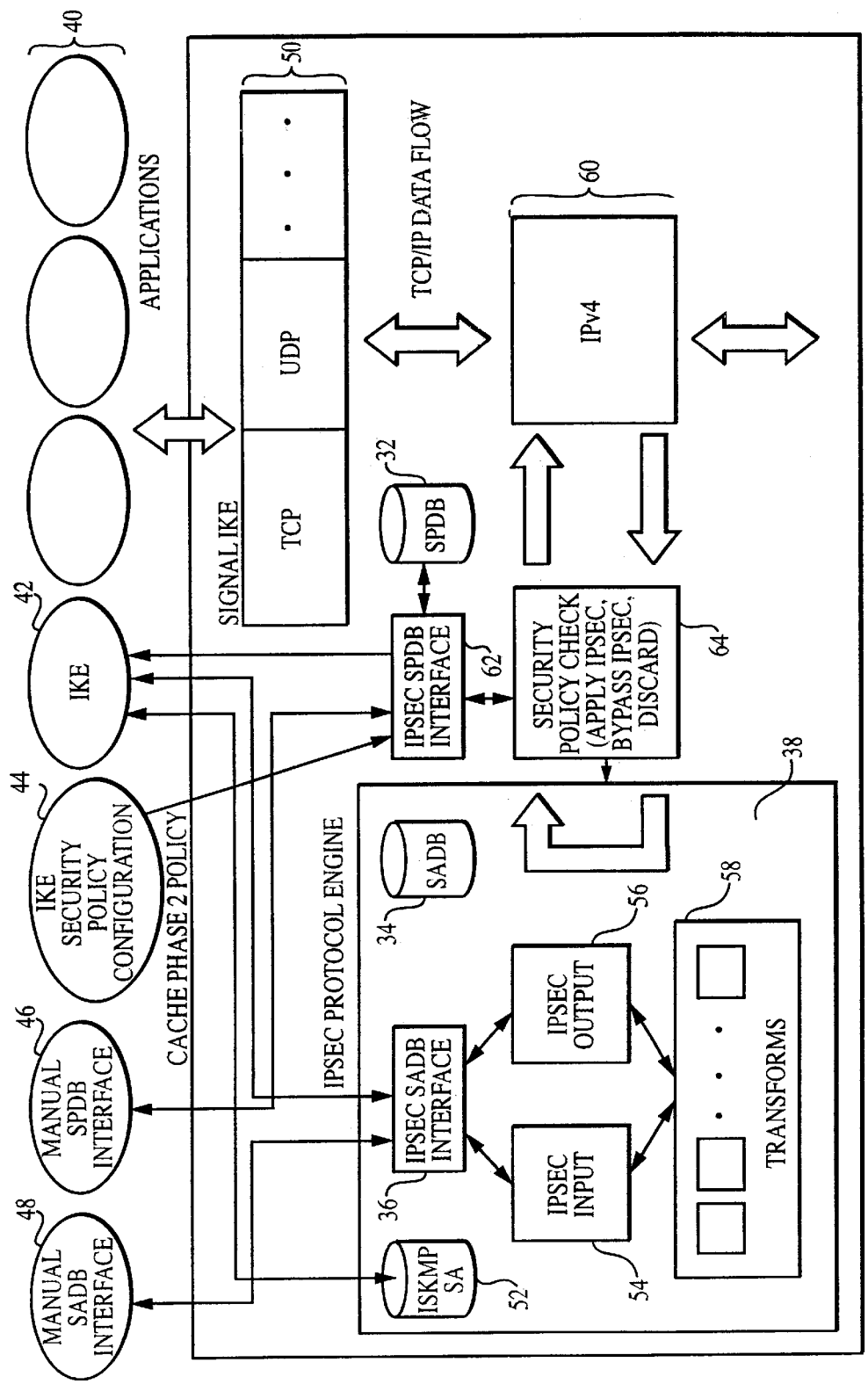
FIG. 2 is a block diagram of an Internet Protocol Security (IPSec) software architecture.

Referring to FIG. 2, RAS 18 with Internet Protocol Security (IPSec) safeguards against malicious attacks at an application layer 40 by having the security processing performed at the network layer 60. The level of security afforded by use of the IPSec protocol depends on the type of IPSec software security architecture implemented. The IPSec software security architecture 30 uses two independent databases: a security policy Database (SPDB) 32 and a security association database (SADB) 34. The use of two separate independent databases offers strong access control, connectionless integrity, data origin authentication, replay protection and confidentiality at the network layer.

SADB 34 is a part of an IPSec protocol engine 38. The IPSec protocol 38 is connected to an automatic Internet Key Exchange (IKE) 42 through an IPSec SADB Interface 36. IKE 42 is a special application that establishes, in conjunction with IPSec SADB interface 36, IPSec tunnels 21a–21b. IKE 42 IPSec also provides input to the Internet Secure Key Exchange Management Protocol Security Association (ISKMPSA) database 52 which functions as a link list to store keys. IPSec SADB interface 36 can also receive inputs manually through a manual SADB interface 48 using a command line interface (CLI). These inputs like all manual inputs in this description can be made from clients, 19a–19c (referring to FIG. 1). As explained below IPSec input messages 54 and IPSec output 56 connect to IPSec SADB 36 interface to access SADB 34. An IPSec transform engine 58 provides the IPSec packet header and footer information.

An IPSec SPDB interface 62 receives manual input from the manual SPDB interface 46 and from the IKE security policy configuration 44 and acts as an interface for SPDB 32. IPSec SPDB interface may be implemented using an Application Program Interface (API) configuration.

By placing SADB 34 and SPDB 32 at a network layer 60, network layer 60 and upper transport layer protocols 50 are both protected from malicious attacks. Inputs from application layer 40 through transport layer 50 or from network layer 60 are processed at the network layer 60 through a security policy check 64. As will be explained below, SPDB 32 and SADB 34 are both used to process inbound and outbound messages. Each database is independent of the other database. In order for SPDB 32 and SADB 34 to function efficiently, the implementation of each database uses fast and flexible algorithms. SPDB 32 uses a modified Practical Algorithm to Retrieve information Coded in Alphanumeric (PATRICIA) trees for selector look-up while SADB 34 uses a hash table.

SPDB 32 specifies rules for the type of packet traffic that is subject to IPSec processing and the level of IPSec protection. The level of protection includes whether to apply IPSec, bypass IPSec, or discard the packet. In other words, when a packet is received, the system will either apply IPSec to the packet, bypass IPSec and send the packet on to be processed, or discard the packet from the system. SPDP 32 contains an ordered list of policy entries keyed by one or more selectors. These selectors include source/destination IP address with or without subnet, IP protocol and source/destination port. SPDB 32 is typically cached in the system for performance benefit.

SADB 34 is responsible for the security information for two systems, e.g., RAS 18 and client 19b. Each IPSec security association is uniquely identified by an IP destination, an IPSec protocol, and a security policy index (SPI). The IPSec protocol specifies the IPSec protocol to be applied on the packet traffic for each security association. The protocol could be either in authentication header (AH) or encapsulation security payload (ESP) form. The SPI is a 32-bit identifier value used to distinguish among different security associations terminating at the same destination and using the same IPSec protocol. The SPI value is normally negotiated through an Internet Key Exchange (IKE).

Each SADB entry defines the parameters for IP security processing. Typical parameters include sequence number counter, anti-replay window, data authentication algorithm and key (AH and ESP), data encryption algorithm and key, lifetime of the security association, and IPSec protocol mode (transport/tunnel). A sequence number counter is a 32-bit value used to generate a sequence number for sequence number fields in AH and ESP headers. The sequence number is generally used for outbound traffic. A sequence number counter is initialized to zero and incremented monotonically. The anti-replay window is a 32-bit counter and bit-map used to determine whether an inbound packet (authentication header (AH) or encapsulation security payload (ESP) protocol) is a replay event. A replay event is a malicious attack where a captured copy of legitimately communicated data (IP packet) is retransmitted for illegitimate purposes. The lifetime of the security association is a time interval after which a security association is replaced with a new security association and new SPI or the security association is terminated. The lifetime also determines which of these actions should occur. It can be expressed as a time or a byte count, or both. If both are given one can be designated to take precedence such as the first to occur.

Figure 3:
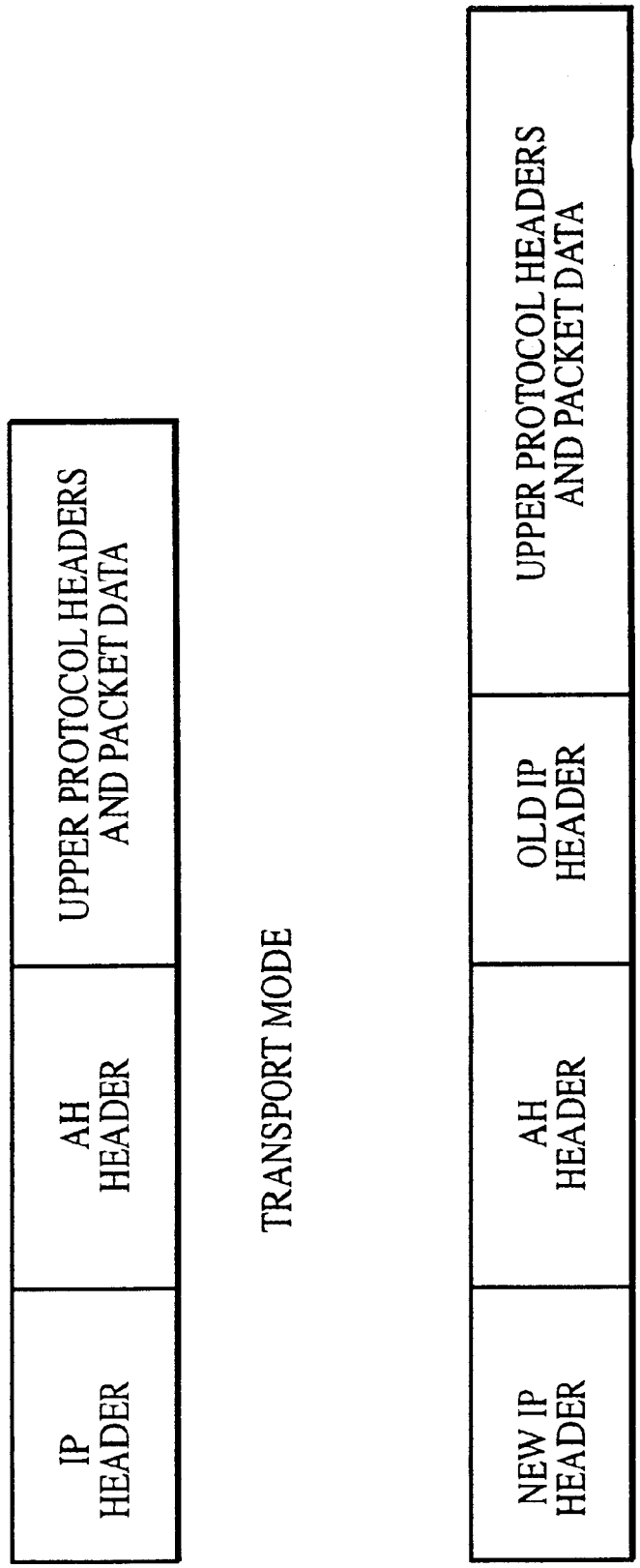
FIG. 3 is a diagram that depicts Internet packet formats for encapsulation security payload (ESP).
Figure 4:
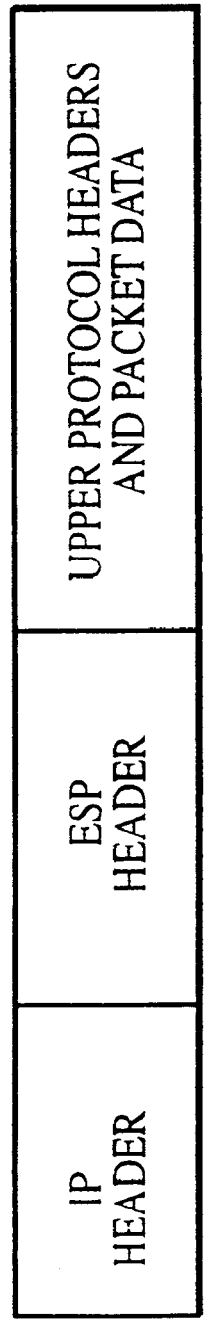
FIG. 4 is a diagram that depicts Internet packet formats for authentication header (AH).
Figure 4:
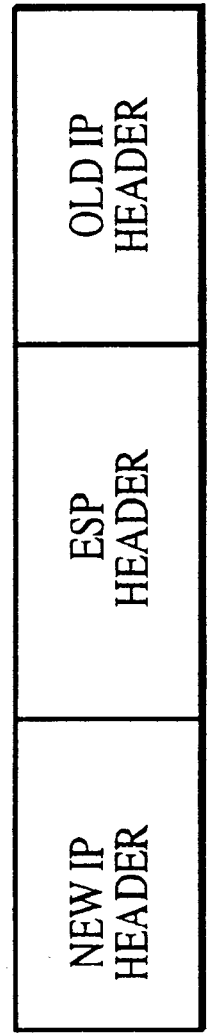

Referring to FIGS. 3 and 4, formats for the transport and tunnel modes are shown. The IPSec transport mode is used when the IP security protocol header appears immediately after the original header. The IPSec tunnel mode has an "outer" IP header specified for the IP processing destination and the "inner" header specifies the ultimate destination for the IP packet. The IP security protocol header appears after the "outer" IP header, and before the "inner" IP header.

Figure 5:
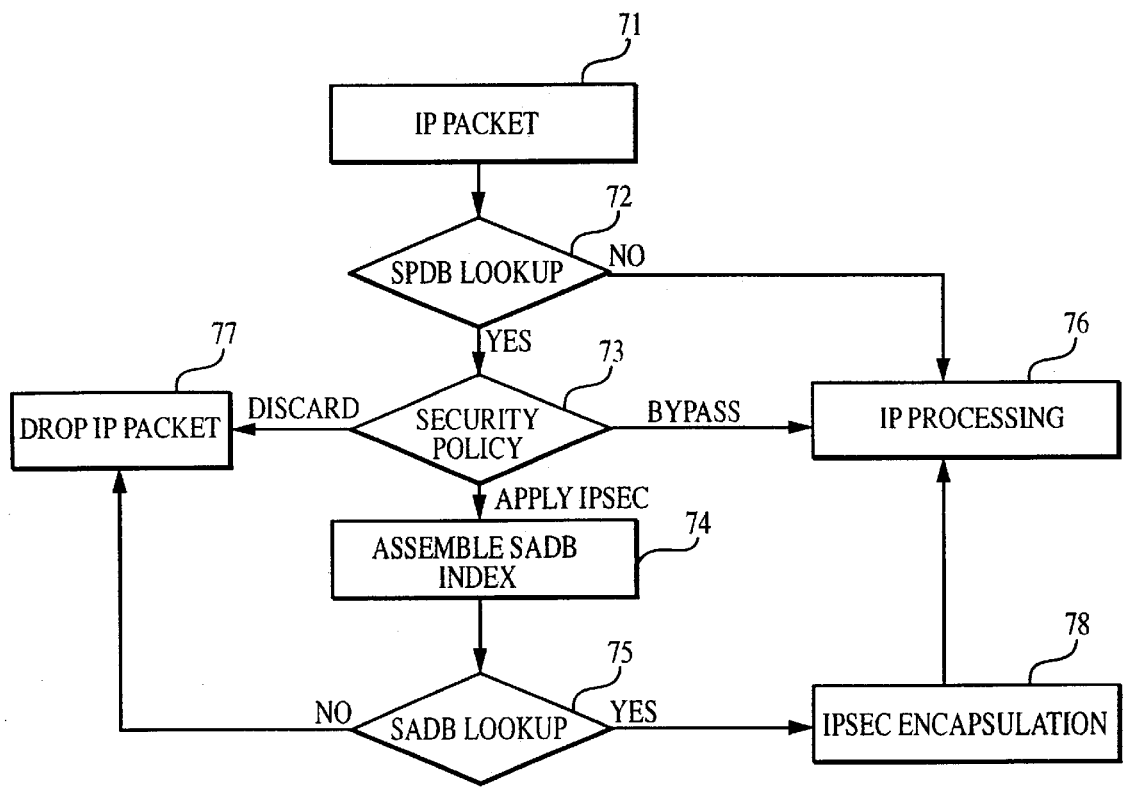
FIG. 5 is a flowchart of IPSec outbound processing.

Referring to FIG. 5, during outbound IPSec processing, an IP packet 71 is subject to a look-up 72 in the SPDB 34 based on pre-defined selectors. If a SPDB entry is not found for a given selector, the IP packet 71 is forwarded for IP processing 76. If an SPDB entry 73 is found, the IPSec security policy is checked 73. If the security policy is Discard, the IP packet is dropped 77. If the security policy is Bypass, the IP packet is forwarded to IP processing 76. If the security policy is Apply IPSec, a SADB index (destination IP address, SPI and IPSec protocol) is retrieved 74 from the SPDB entry. The SADB index is used for SADB lookup 75. If the SADB entry is not found, the IP packet is dropped 77. If the SADB entry is found, the IP packet is forwarded for IPSec encapsulation 78.

Figure 6:
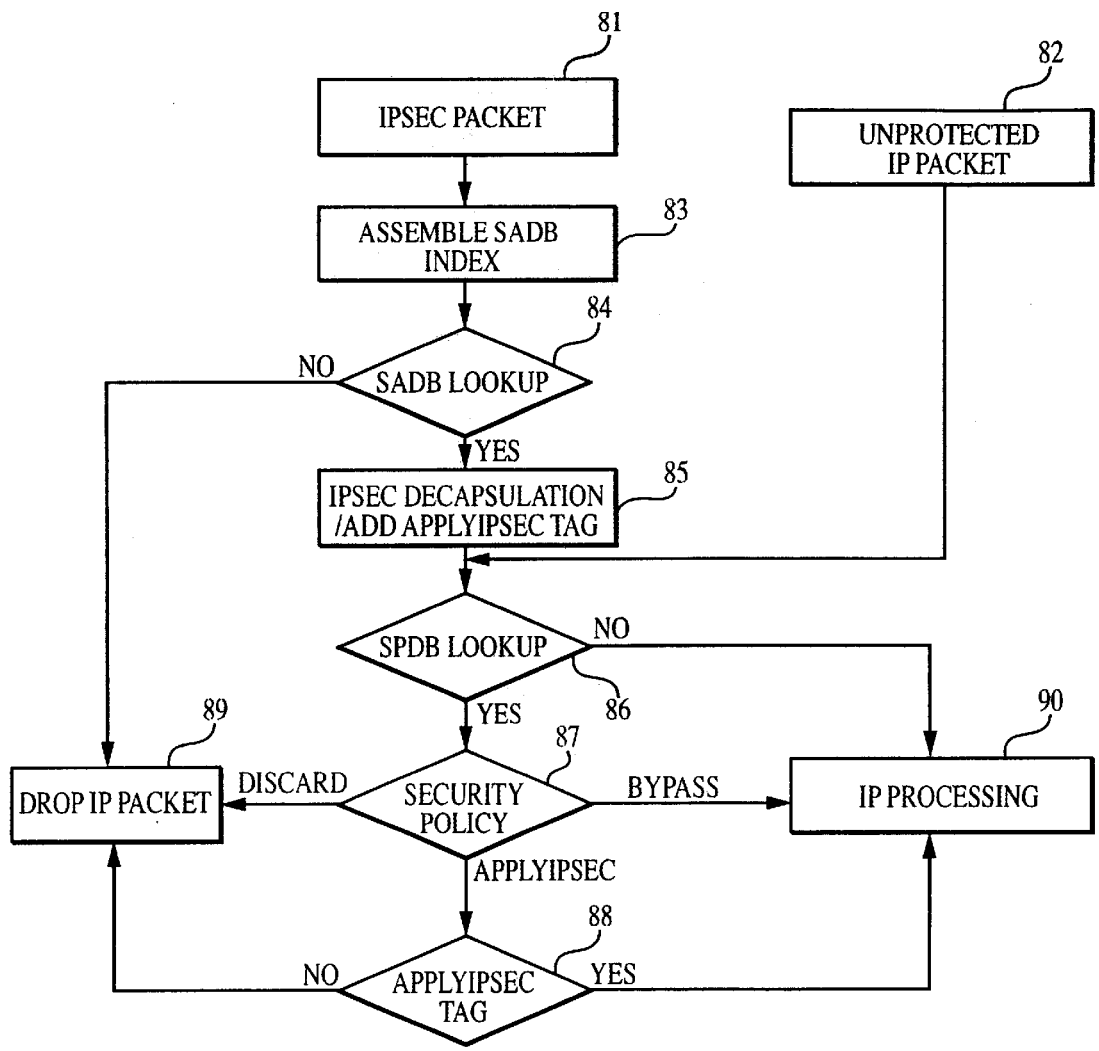
FIG. 6 is a flowchart of IPSec inbound processing.

Referring to FIG. 6, during inbound processing, if the IP packet is identified 81 to be an IPSec packet by the IP protocol field. An SADB index is assembled 83 using the parameters in IPSec header for a lookup in the SADB 84. If a SADB entry is not found, the IPSec packet is dropped 89. If a SADB entry is found, it is forwarded for IPSec decapsulation 85. The IP packet is tagged to be Apply IPSec and it is forwarded for a SPDB lookup 86. An unprotected IP packet 82 is also forwarded for a SPDB lookup 86. If a SPDB entry is not found, the IP packet is forwarded to IP processing 90.

If a SPDB entry is found, the IPSec security policy is checked 87. If the security policy is Discard, the IP packet is dropped 69. If the security policy is Bypass, the IP packet is forwarded to IP processing 90. If the security policy is Apply IPSec, the tag in the IP packet is retrieved 88. If the tag is Apply IPSec, the IP packet is passed to IP processing 90 because the packet has been successfully de-capsulated by the IPSec protocol engine. If the IP packet is not tagged, the IP packet is dropped 89.

Figure 7:
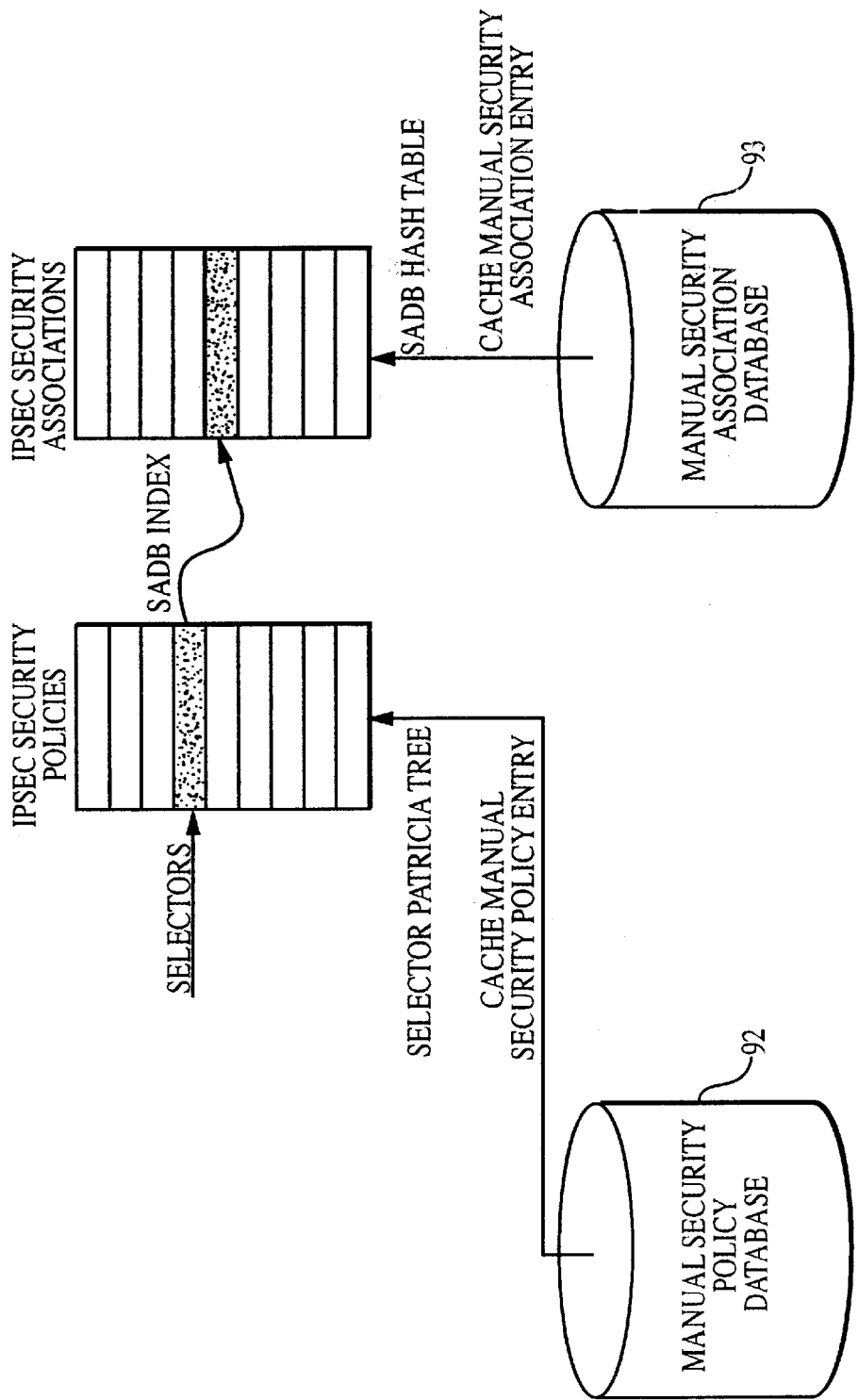
FIG. 7 is a block diagram that depicts a Practical Algorithm To Retrieve Information Coded In Alphanumeric (PATRICIA) Tree for Security Policy Database (SPDP) and a hash tree for Security Association Database (SADB) for manual and automatic operation.

This process is used to safeguard attacks since the IP packet after de-capsulation cannot be distinguished from a spoofed IP packet. In summary, referring to FIGS. 2 and 7, each IP packet or IPSec packet for both inbound and outbound IPSec processing uses one lookup in the SPDB 32 and one lookup in the SADB 36. Inputs into SPDB 32 can be made through a Manual SPDB 92 via Manual SPDB interface 46 and inputs into SADB 34 can be made through a Manual SADB 93 via Manual SADB interface 48.

The SPDP look-up requires a fast and efficient algorithm because the software security architecture for the Internet Protocol has diverse selector keys based on destination address with ranges and wildcarding, source address with ranges and wildcarding, data sensitivity labeling (Internet Protocol Security Option/Commercial Internet Security Option (IPSO/CIPSO) labels), transport layer protocols, User Datagram Protocol/Transmission Control Protocol (UDP/TCP) ports, and the possibility of future fields. Therefore, it is desirable to use variable length keys with combinations of masking and ranges. A hash table implementation is less preferred. A Practical Algorithm to Retrieve Information Coded in Alphanumeric or PATRICIA tree implementation of the SPDB has the needed flexibility.

By adapting the PATRICIA tree, SPDB Lookup can be done by modifying the software code. The following is an adaption of the PATRICIA Tree:

```
typedef struct spd_key_data_s
{
    unsigned long dst_ip_address;
    unsigned short dst_port;
    unsigned short protocol;
```

-continued

```
    unsigned long src_ip_address;
    unsigned short src_port;
} spd_key_data_t;
#define SPD_DATA_SIZE sizeof(spd_key_data_t)
typedef union spd_data_u
{
    spd_key_data_t spd_key;
    unsigned char spd_opaque_data[SPD_DATA_SIZE];
} spd_data_u;
typedef struct spd_data_s
{
    unsigned char spd_len;
    unsigned char family; /* not used now but could be */
    unsigned short filler; /* keep everything aligned */
    spd_data_u spd_data;
} spd_data_t;
#define CURRENT_SPD_DATA_LENGTH sizeof(spd_data_t)
/* adapted from the BSD route.h rtentry declaration */
struct spd_entry
{
    struct radix_node spd_nodes[2]; /* tree stuff -see Stevens
        page 569 */
    unsigned long int gateway;
    K_SADB sa_key;
    unsigned char policy;
    unsigned short key;
};
typedef struct spd_entry spd_entry;
```

The following functions are used for insert, search and delete SPDB entry in the PATRICIA tree:

```
spd_entry * spd_insert(spd_data_t * the_entry,
        spd_data_t *mask,
        unsigned long gateway,
        unsigned long spi,
        unsigned char policy,
            unsigned char protocol,
        unsigned short key;
        struct radix_node_head *spd_tree);
spd_entry * spd_delete(spd_data_t * deletee,
        struct radix_node_head * spd_tree,
        spd_data_t *mask);
spd_entry * spd_search(spd_data_t * spd_stuff,
        struct radix_node_head * spd_tree).
```

The keys for the PATRICIA tree include a source/destination IP Address, IP protocol and source and destination ports. In Internet Protocol Version 4 (IPv4), there is a 112 bits in a key: 32 bits source IP address, 32 bits destination address, 16 bits source port, 16 bits destination port and 16 bits IP protocol. Instead of using an 8-bit IP protocol, a 16-bit IP protocol is used for alignment in PATRICIA tree. Masks are used to support both source IP address wildcard and destination IP address wildcard. Masks are also used if a match against IP protocol, source port, and destination port is required.

Each node in a PATRICIA tree contains the IPSec security policy and the index to SADB 36. The IPSec security policy, which includes Apply IPSec, Bypass IPSec and Discard, are defined and configured for outbound and inbound traffic on a per selector basis.

Since each IPSec SADB entry is uniquely identified by a destination IP address, SPI, and IPSec protocol (AH or ESP), a hash table is a suitable algorithm for SADB lookup 36. The hash table is a fast and efficient algorithm for table lookup and the performance does not degrade with large table entry. The divide by a prime is chosen over a multiplication method because the hash bucket is evenly distributed while the multiplication method tends to aggregate the hash bucket. Several modifications and parameters are applied to the basic divide by a prime hashing hash table to work in the IPSec environment. These changes include hashing function modification and prime number selection.

First, in hashing function modification, since the destination IP address, SPI, and IPSec protocol uniquely identify the security association, the combination of these parameters can be used as a hash key in a hash table lookup for security association. The concatenation of IPv4 Destination IP address (32 bits), SPI (32 bits) and IPSec protocol (8 bits) is 72 bits. 72 bits is more than the 32-bit division that can be supported by a 32-bit central processing unit (CPU). Thus, it is inefficient to implement large number division using the basic 32-bit arithmetic operators. Therefore, a mixing function is used to mix and scramble these 72 bits into a 32-bit value prior to division by a prime number such as the following pseudo code:

```
    unsigned long result, hash;
    char *str;
    int i;
    hash = spi;
    result = hash >> 24;
    hash = ((hash << 8) | result) ^ ip_protocol;
    str = (char *)&ip_address
    for (i=0; i<4; i++) {
        result = hash >> 24;
        hash = ((hash <<8) | result) ^ *str++;
    }
```

Second, a prime number is also selected to improve the efficiency. Since hundreds of SADB entries can reside in an IPSec enabled system, a suitable prime number is selected to meet both the performance requirement and memory requirement. From a list of prime numbers 53, 97, 193, 389, 769, 1543, 3079, 6151, 12289, 24593, 389 is chosen to give the best solution between performance requirement and memory requirement.

Other embodiments not described here are also within the scope of the following claims.

What is claimed is:

1. A method of providing Internet Protocol (IP) security at a network layer, the method comprising:
   using two or more independent databases to process secure information, with a first database specifying rules for the IP security and a level of security, and with a second database maintaining security information for at least two systems, by;
      determining if a selector matches an entry in the first database for processing an outbound IP packet; and
      assembling an index into the second database and using the index to perform a lookup in the second database for processing an inbound IP packet.

2. The method of claim 1, wherein the first database includes security policy entries.

3. The method of claim 2, wherein the security policy entries include a source IP address, a destination IP address, an IP protocol, a source port, and/or a destination port.

4. The method of claim 2, wherein the first database uses a Practical Algorithm to Retrieve Information coded in Alphanumeric (PATRICIA) tree to look-up security policy entries.

5. The method of claim 1, wherein the first database is cached.

6. The method of claim 1, wherein the second database includes security association entries.

7. The method of claim 6, wherein each security association defines one or more parameters required for the IP security.

8. The method of claim 6, wherein a hash table is used to look-up security association entries.

9. The method of claim 7, wherein the one or more parameters include an IP destination, an IP security protocol, and a security parameter index.

10. The method of claim 9, wherein the IP security protocol is in an authentication header format.

11. An apparatus for transmitting data packets, comprising:
   a processor that executes the instructions; and
   a memory that stores executable instructions for causing the processor to:
   use two or more independent databases to process secure information; a first database specifying rules for the IP security and a level of security; and a second database maintaining security information for at least two systems, by;
      determining if a selector matches an entry in the first database for processing an outbound IP packet; and
      assembling an index into the second database and using the index to perform a lookup in the second database for processing an inbound IP packet.

12. The apparatus of claim 11, wherein the first database includes security policy entries.

13. The apparatus of claim 12, wherein the security policy entries include a source IP address, a destination IP address, an IP protocol, a source port, and/or a destination port.

14. The apparatus of claim 12, wherein the first database uses a Practical Algorithm to Retrieve Information coded in Alphanumeric (PATRICIA) tree to look-up security policy entries.

15. The method of claim 11, wherein the first database is cached.

16. The apparatus of claim 11, wherein the second database includes security association entries.

17. The apparatus of claim 16, wherein each security association defines one or more parameters required for the IP security.

18. The apparatus of claim 17, wherein the one or more parameters include an IP destination, an IP security protocol, and a security parameter index.

19. The apparatus of claim 16, wherein a hash table is used to look-up security association entries.

20. The apparatus of claim 18, wherein the IP security protocol is in an authentication header format.

21. The apparatus of claim 18, further comprising executable instructions to use the IP destination, the IP security protocol and the security parameter index as a hash key in a hash table lookup for a security association.

22. The apparatus of claim 21, further comprising executable instructions to select a prime number.

23. The apparatus of claim 22, wherein to select comprises to select '389'.

24. The apparatus of claim 14, wherein the PATRICIA tree includes nodes and each node comprises a rule for the IP security and an index into the second database.

25. The method of claim 8, further comprising using the IP destination, the IP security protocol and the security parameter index as a hash key in a hash table lookup for a security association.

26. The method of claim 25, further comprising selecting a prime number.

27. The method of claim 26, wherein selecting comprises selecting '389'.

28. The method of claim 4, wherein the PATRICIA tree includes nodes and each node comprises a rule for the IP security and an index into the second database.

* * * * *